US008082659B2

(12) United States Patent
Takizawa et al.

(10) Patent No.: US 8,082,659 B2
(45) Date of Patent: Dec. 27, 2011

(54) METHOD OF FORMING A LOOP WINDING

(75) Inventors: Daijiro Takizawa, Wako (JP); Hisashi Katoh, Wako (JP); Tadanobu Takahashi, Wako (JP); Sunao Morishita, Yokohama (JP); Kei Oohori, Yokohama (JP)

(73) Assignees: Honda Motor Co., Ltd., Tokyo (JP); Toyo Seikan Kaisha, Ltd., Tokyo (JP)

( * ) Notice: Subject to any disclaimer, the term of this patent is extended or adjusted under 35 U.S.C. 154(b) by 0 days.

(21) Appl. No.: 12/841,665

(22) Filed: Jul. 22, 2010

(65) Prior Publication Data
US 2010/0281680 A1 Nov. 11, 2010

Related U.S. Application Data

(62) Division of application No. 11/878,767, filed on Jul. 26, 2007, now Pat. No. 7,784,172.

(30) Foreign Application Priority Data

Jul. 27, 2006 (JP) ................................. 2006-204510
Apr. 27, 2007 (JP) ................................. 2007-119376

(51) Int. Cl.
    *H01F 7/06* (2006.01)
(52) U.S. Cl. ................ 29/605; 29/596; 29/597; 29/598; 29/606; 29/609; 310/179
(58) Field of Classification Search .................. 29/606, 29/605, 732, 733, 735, 596, 609, 597, 598; 310/216, 179, 201, 215; 242/365.6, 365.5, 242/360, 329; 72/315, 312, 313, 314, 452.9
See application file for complete search history.

(56) References Cited

U.S. PATENT DOCUMENTS

| 4,909,057 | A | | 3/1990 | Fritzsche | |
|---|---|---|---|---|---|
| 5,163,217 | A | * | 11/1992 | Sakanishi | .................... 29/564.6 |
| 5,881,778 | A | | 3/1999 | Barrera | |
| 5,937,508 | A | * | 8/1999 | Shiga | .............................. 29/598 |
| 6,196,040 | B1 | * | 3/2001 | Matsuoka | ....................... 72/315 |
| 6,745,606 | B2 | | 6/2004 | Kazuyoshi | |
| 7,185,414 | B2 | * | 3/2007 | Sadiku | ............................ 29/598 |
| 2002/0046779 | A1 | | 4/2002 | Even | |

FOREIGN PATENT DOCUMENTS

| JP | 11-299137 A | 10/1999 |
|---|---|---|
| JP | 2002-165396 A | 7/2002 |
| JP | 2005-306778 A | 11/2005 |

* cited by examiner

*Primary Examiner* — Derris Banks
*Assistant Examiner* — Tai Nguyen
(74) *Attorney, Agent, or Firm* — Arent Fox LLP

(57) ABSTRACT

A method for forming a loop winding having a plurality of meandering parts and disposed in a stator of a motor which includes: disposing the loop winding between a first die unit having a plurality of first dies and a second die unit having a plurality of second dies; and press forming the loop winding between the first dies and the second dies by relatively moving the first die unit and the second die unit toward each other, wherein the press forming step is so performed as to provide the loop winding with a plurality of meandering parts and, simultaneously, to reduce the loop winding in the radial direction.

2 Claims, 17 Drawing Sheets

US 8,082,659 B2

METHOD OF FORMING A LOOP WINDING

CROSS-REFERENCE TO RELATED APPLICATIONS

This is a Divisional Application which claims the benefit of pending U.S. patent application Ser. No. 11/878,767, filed on Jul. 26, 2007, and claims priority of Japanese Patent Application No. 2006-204510, filed on Jul. 27, 2006, and Japanese Patent Application No. 2007-119376, filed on Apr. 27, 2007. The disclosures of the prior applications are hereby incorporated herein in their entirety by reference.

BACKGROUND OF THE INVENTION

1. Field of the Invention

The present invention relates to a forming machine for forming a meandering loop winding used as a stator winding in a motor and to a method of forming the meandering loop winding.

2. Description of the Related Art

As a hybrid powered vehicle motor or an electric vehicle motor, the permanent magnet type alternating current synchronous motor or brushless DC motor in which permanent magnets are used in a rotor is widely used. As one of this type of motors, a permanent magnet type three-phase synchronous motor having a stator in which windings on a concentrated winding mode are wound around stator cores provided respectively for three phases (U phase, V phase, and W phase) so as to perform three-phase driving of a rotor having permanent magnets by the stator has been known, as for example described in Japanese Patent Laid-open No. Hei 11-299137.

In addition, a permanent magnet type three-phase synchronous motor having a stator in which windings for three phases (U phase, V phase, and W phase) are wound in wavy forms by disposing them in the manner of threadingly extending between teeth (claw poles) adjacent to each other in the circumferential direction so as to perform three-phase driving of a rotor by the stator has been known, as for example described in Japanese Patent Laid-open No. 2002-165396.

In the above-mentioned three-phase synchronous motors according to the related art, the windings are needed on the basis of each of the three phases. Therefore, it is difficult to suppress an increase in the number of component parts required to constitute the stator, and much labor is needed for winding the respective windings for the three phases. Moreover, in the stator having the windings on the wave winding mode, it is difficult to enhance the winding occupation factor between the adjacent teeth. Further, it is difficult to reduce the size in the axial direction of the motor by reducing the height at the coil end, in order to enhance the mountability onto a vehicle or the like.

In order to solve these problems in the related art, the present applicant has previously proposed a motor stator in which stator rings for three phases and loop windings for two phases are alternately disposed in the manner of sequentially stacking along a direction parallel to the axis and in which each of the loop windings is provided with a plurality of meandering parts so as to increase the magnetic flux generated by the stator (refer to Japanese Patent Application No. 2005-306778).

The stator in the permanent magnet type three-phase synchronous motor or claw pole motor according to the previous patent application mentioned above is configured by use of the loop windings having a plurality of meandering parts. However, such a loop winding having meandering parts was not generally used in the past, and, therefore, establishment of a method for forming such a meandering loop winding is being desired.

SUMMARY OF THE INVENTION

Accordingly, it is an object of the present invention to provide a forming machine for efficiently manufacturing a loop winding having a plurality of meandering parts.

It is another object of the present invention to provide a method of forming a meandering loop winding, for efficiently manufacturing a loop winding having a plurality of meandering parts.

In accordance with an aspect of the present invention, there is provided a forming machine for forming a loop winding having a plurality of meandering parts and disposed in a stator of a motor, the forming machine including: a first die unit having a plurality of first dies spaced from each other at regular intervals in a circumferential direction; and a second die unit having a plurality of second dies which are spaced from each other at the same intervals as the regular intervals in a circumferential direction and which are each disposed between adjacent ones of the first dies, wherein each of the second dies has a winding holding part for holding a loop winding; and the first die unit and the second die unit are each provided with a winding diameter reducing means for reducing the loop winding in the radial direction according to a displacement of the first die unit in an axial direction relative to the loop winding held by the winding holding parts.

According to this configuration, the first and second die units are each provided with the winding diameter reducing means for reducing the loop winding in the radial direction according to the displacement of the first die unit in the axial direction in forming the meandering loop winding; therefore, it is possible to largely reduce the elongation of the loop winding during forming of the meandering parts in the loop winding, and to remarkably enhance the productivity in the press forming.

Preferably, the number of the first dies and the number of the second dies are equal to or greater than the number of poles of the stator in the motor. With the numbers of the first dies and the second dies set to be equal to or greater than the number of the poles of the stator in the motor, the meandering parts of the loop winding can be securely disposed adjacently to each of the poles of the stator.

Preferably, a holding surface, facing an outer peripheral part of the loop winding, of each of the winding holding parts has a radius of curvature equal to or greater than the radius of curvature of the outer peripheral part before working of the loop winding, and a holding surface, facing an inner peripheral part of the loop winding, of each of the winding holding parts has a radius of curvature equal to or smaller than the radius of curvature of the inner peripheral part after the working of the loop winding.

With the radii of curvature of the holding surfaces of the winding holding parts thus set appropriately, it is possible to securely hold the loop winding, without exerting any irrational stress on the loop winding which is varied in diameter through the process of press forming (working).

Preferably, the winding diameter reducing means includes a plurality of first rollers each of which is radially displaceably provided adjacent to each of the first dies, a plurality of first roller guides which are provided in the second die unit and which are each suitable for rolling thereon of each of the first rollers, a plurality of second rollers each of which is radially displaceably provided adjacent to each of the second dies, and a plurality of second roller guides which are provided in the first die unit and which are each suitable for rolling thereon of each of the second rollers; and a roller rolling surface of each of the first and second roller guides is a curved surface.

Since the roller rolling surface of each of the first and second roller guides constituting the winding diameter reducing means is formed to be a curved surface, the first and second rollers roll on the curved surface shaped roller rolling surfaces of the first and second roller guides according to the displacement in the axial direction of the first die unit. Therefore, it is possible to reduce the winding diameter according to the extent of working of the loop winding, and to form the plurality of meandering parts without exerting any irrational stress on the loop winding.

In accordance with another aspect of the present invention, there is provided a method of forming a loop winding having a plurality of meandering parts and disposed in a stator of a motor, the method including the steps of: disposing the loop winding between a first die unit having a plurality of first dies and a second die unit having a plurality of second dies; and press forming the loop winding between the first dies and the second dies by relatively moving the first die unit and the second die unit toward each other, wherein the press forming step is so performed as to provide the loop winding with a plurality of meandering parts and, simultaneously, to reduce the loop winding in the radial direction.

According to this configuration, it is possible to form the plurality of meandering parts in the loop winding and simultaneously to reduce the loop winding in the radial direction, by the press forming step. Therefore, it is possible to efficiently form the loop winding having a plurality of meandering parts, without exerting any irrational stress on the loop winding.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
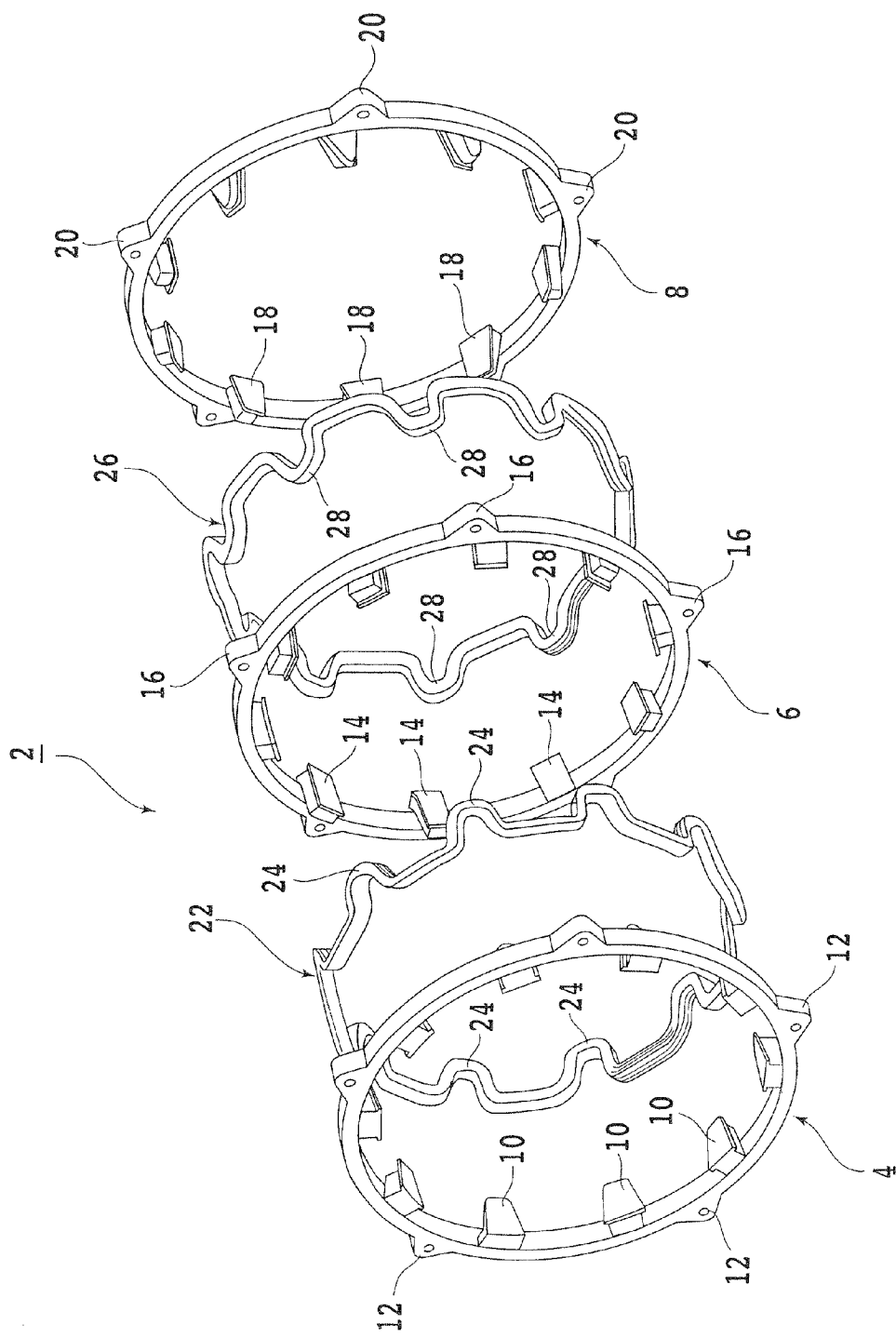
FIG. 1 is an exploded perspective view of a stator having a meandering loop winding to which the present invention is applied.

Now, preferred embodiments of the present invention will be described in detail below referring to the drawings. First, before describing a forming machine for forming a meandering loop winding according to an embodiment of the present invention, a stator in which a loop winding formed by the forming machine based on the present invention is mounted will be described referring to FIGS. 1 to 3. This annular stator 2 constitutes, for example, a permanent magnet type alternating current synchronous motor (also called a brushless DC motor or a claw pole type motor) to be mounted on a hybrid powered vehicle as a vehicle drive source together with an engine. For example, in a parallel hybrid powered vehicle with a structure in which an engine, a claw pole type motor and a transmission are connected in series, the drive force of at least either one of the engine and the claw pole type motor is transmitted through the transmission to drive wheels of the vehicle.

In addition, when a drive force is transmitted from the drive wheel side to the claw pole type motor when the vehicle is decelerated, the claw pole type motor functions as a generator to generate the so-called regenerative braking force, whereby the kinetic energy of the vehicle body is recovered as electrical energy (regenerative energy). Further, also when the output of the engine is transmitted to the claw pole type motor, the claw pole type motor functions as a generator to generate electrical energy.

Figure 2:
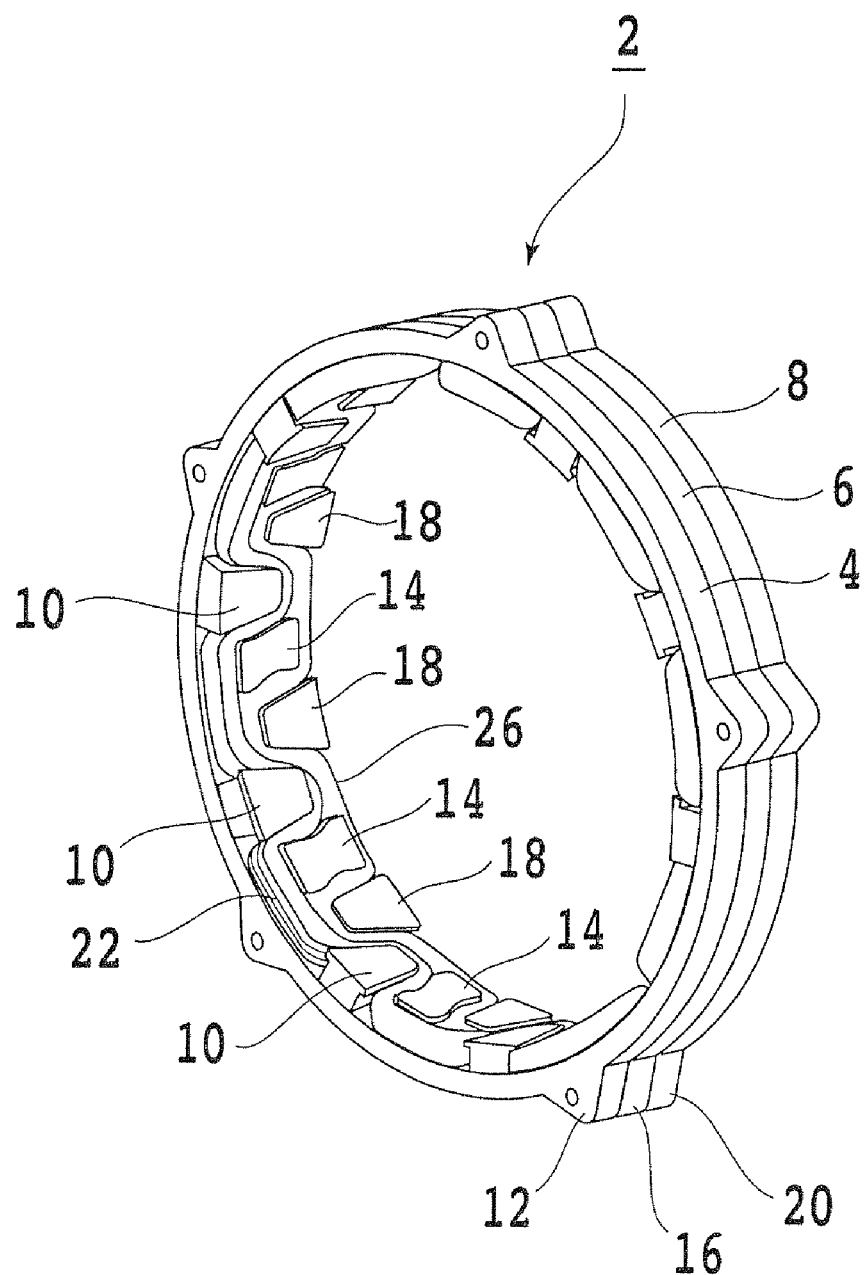
FIG. 2 is a perspective view of the stator in its assembled state.

Referring to FIG. 1, there is shown an exploded perspective view of the annular stator 2 to which a meandering loop winding is mounted. FIG. 2 is a perspective view of the stator 2 after assembled. As shown in FIG. 1, the annular stator 2 includes a U-phase stator ring (teeth ring) 4, a V-phase stator ring (teeth ring) 6, a W-phase stator ring (teeth ring) 8, a U-phase loop winding 22, and a W-phase loop winding 26.

The U-phase stator ring 4 has a plurality (in this embodiment, ten) of U-phase teeth (U-phase claw poles) 10 spaced from each other at regular intervals in the circumferential direction, and a plurality of connecting parts 12 spaced from each other in the circumferential direction. Each of the U-phase teeth 10 is projected to one side (the right side in FIG. 1) in the axial direction. The V-phase stator ring 6 has a plurality (in this embodiment, ten) of V-phase teeth 14 spaced from each other at regular intervals in the circumferential direction, and a plurality of connecting parts 16 spaced from each other in the circumferential direction. Each of the V-phase teeth 14 is projected to both sides in the axial direction.

The W-phase stator ring 8 has a plurality (in this embodiment, 10) of W-phase teeth 18 spaced from each other at regular intervals in the circumferential direction, and a plurality of connecting parts 20 spaced from each other in the circumferential direction. Each of the W-phase teeth 18 is projected to the other side (the left side in FIG. 1) in the axial direction. Namely, the U-phase teeth 10 and the W-phase teeth 18 are projected in such directions as to come close to each other. It is to be noted here that the U-phase teeth 10, the V-phase teeth 14 and the W-phase teeth 18 are disposed at relatively staggered positions so that they do not overlap with each other when the U-phase stator ring 4, the V-phase stator ring 6 and the W-phase stator ring 8 are laminated and joined at their connecting parts 12, 16, 20.

The U-phase loop winding 22 is configured by winding a wire in a loop form, and has a plurality (in this embodiment, ten) of meandering parts 24 meandering in the axial direction of the stator 2. Similarly, the W-phase loop winding 26 also has a plurality (in this embodiment, ten) of meandering parts 28 meandering in the axial direction of the stator 2. When the connecting parts 12, 16, 20 of the stator rings 4, 6, 8 are aligned, the U-phase loop winding 22 and the W-phase loop winding 26 are disposed at predetermined positions in the circumferential direction and the stator rings 4, 6, 8 are fixed together by bolts, the annular stator 2 is completed as shown in FIG. 2.

As is clear from observation of FIGS. 1 and 2, the teeth 10, 14, 18 are arranged in a predetermined sequence (U-phase teeth 10, W-phase teeth 18, V-phase teeth 14, U-phase teeth 10, . . . ) in the circumferential direction; in this case, each meandering part 24 of the U-phase loop winding 22 is disposed between each pair of teeth 10 and 14 adjacent to each other in the circumferential direction, and each meandering part 28 of the W-phase loop winding 26 is disposed between each pair of teeth 14 and 18 adjacent to each other in the circumferential direction. In other words, one of the U-phase teeth 10 is disposed in the U-phase meandering part 24, one of the W-phase teeth 18 is disposed in the W-phase meandering part 28, and one of the V-phase teeth 14 is disposed between the U-phase meandering part 24 and the W-phase meandering part 28 adjacent to each other in the circumferential direction.

The meandering parts 24 of the U-phase loop winding 22 and the meandering parts 28 of the W-phase loop winding 26 are projected in mutually different directions, and the U-phase loop winding 22 and the W-phase loop winding 26 are disposed at positions relatively staggered in the circumferential direction so as to have a phase difference in terms of electrical angle of 240°. This ensures that the loop windings 22, 26 for two phases so disposed as to threadingly extend between the circumferentially adjacent teeth 10, 14 or 14, 18 are so formed as to constitute short-pitch windings at a so-called electrical angle of not more than 120°.

The loop windings having a plurality of meandering parts as above-described are not in general use, and, therefore, establishment of a method for manufacturing such loop windings is being desired. In view of this, there may first be contemplated a method in which a wire is wound around a former designed according to the shape of the slot, and the wound wire is pressed with a die designed according to the slot shape from at least one outer side to achieve the desired forming. In this method, however, the wire is wound around the former on the basis of each turn of the winding, so that handling properties are bad. Further, in the case of a complicatedly shaped slot, it is difficult to wind the wire and, therefore, the number of working steps is increased.

In order to solve this problem, there is a method in which a winding formed in a loop form is pressed from at least one side by a die shaped according to the slot shape, to achieve the desired forming. However, when the meandering parts are formed by pressing, the winding is reduced in diameter, so that it is difficult to restrict the winding to the required diameter size. In addition, since the amount of displacement in working in the radial direction is different from that in the axial direction, the winding would be elongated.

The present invention has been made in order to solve these problems. Now, a forming machine for forming a loop winding in an embodiment of the present invention, which has a means for reducing the loop winding in the radial direction according to the progress of forming of the loop winding, will be described in detail below referring to FIGS. 4 to 13.

Figure 3A:
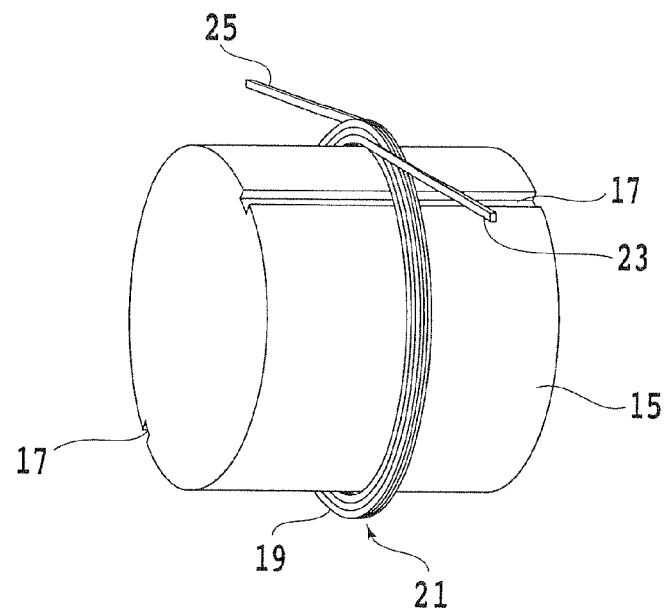
FIGS. 3A to 3C illustrate a method of forming a loop winding.
Figure 3B:
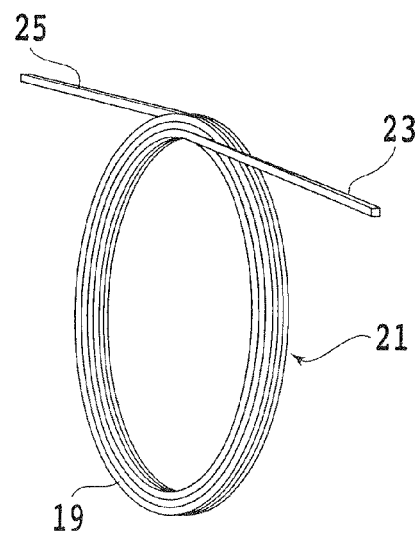
Figure 3C:
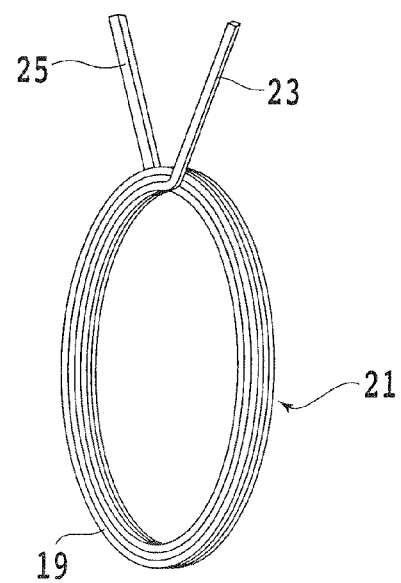

Prior to description of the forming machine, the method of forming a loop winding will be described briefly, referring to FIGS. 3A to 3C. First, as shown in FIG. 3A, a cylindrical body 15 having a groove 17 in the axial direction is prepared. A wire 19 is wound around the cylindrical body 15 to form, for example, a loop winding 21 in three rows and three layers. Symbol 23 denotes the starting end of the winding, while symbol 25 denotes the trailing end of the winding. After the loop winding is thus formed by winding the wire 19 around the cylindrical body 15, a binding band is inserted into the groove 17, and the group of loops (turns) are bound together, to form a loop winding 21. Thereafter, a jig is inserted, and the loop winding 21 is detached from the cylindrical body 15 (see FIG. 3B). Then, as shown in FIG. 3C, the starting end 23 and the trailing end 25 of the winding are formed as desired, to complete the loop winding 21.

Figure 4:
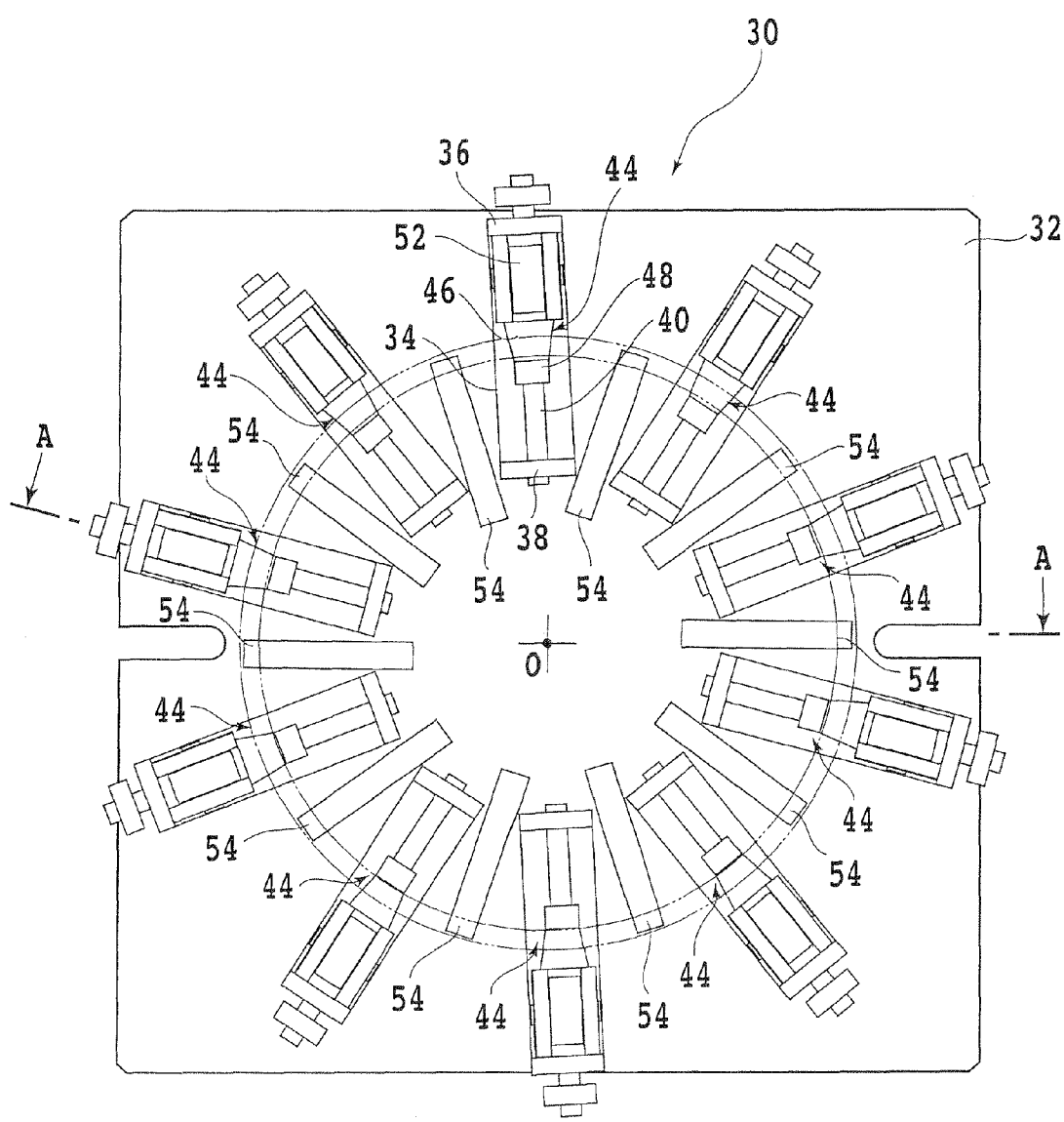
FIG. 4 is a bottom view of an upper die unit before working.
Figure 5:
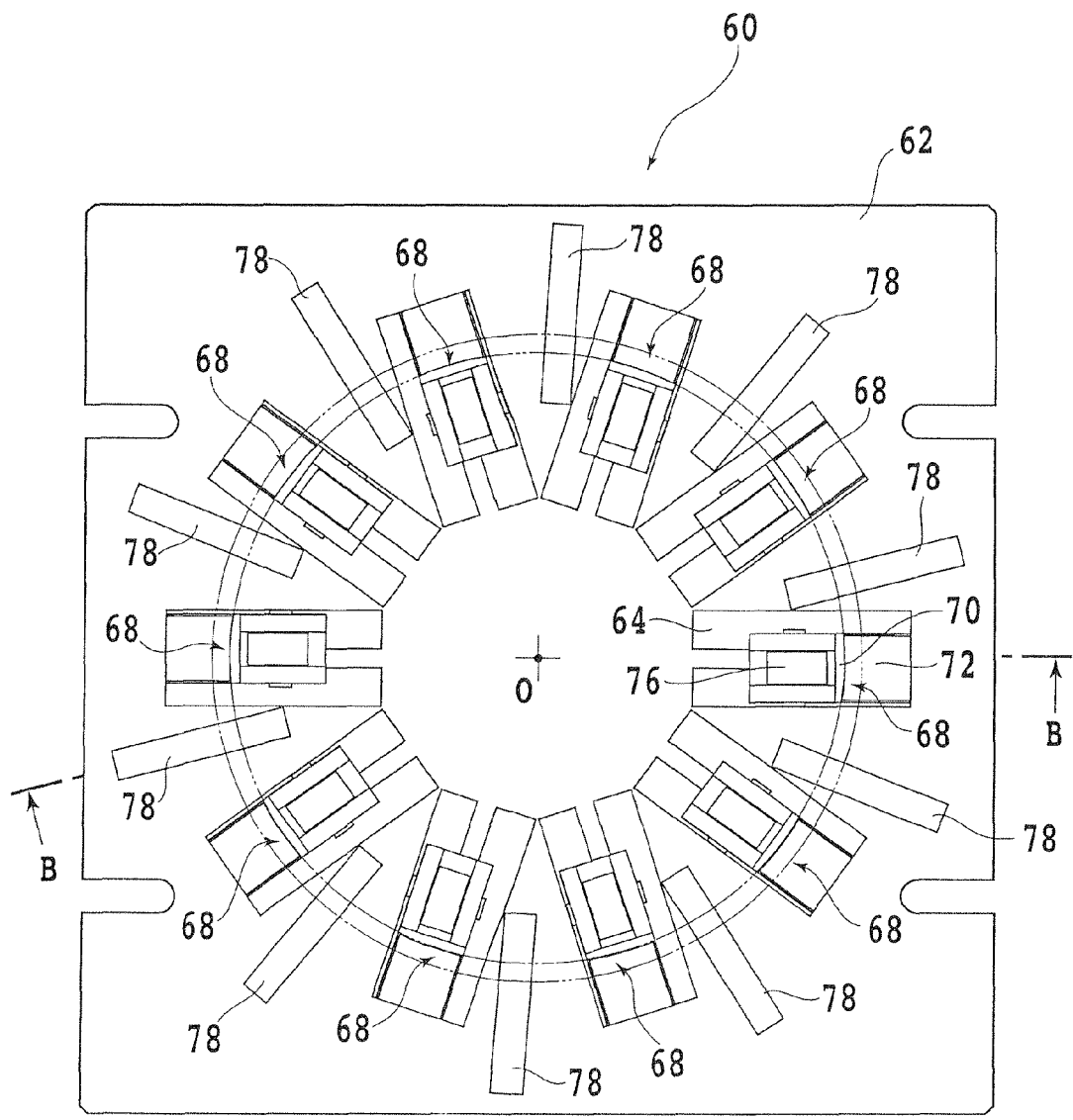
FIG. 5 is a plan view of a lower die unit before working.
Figure 6:
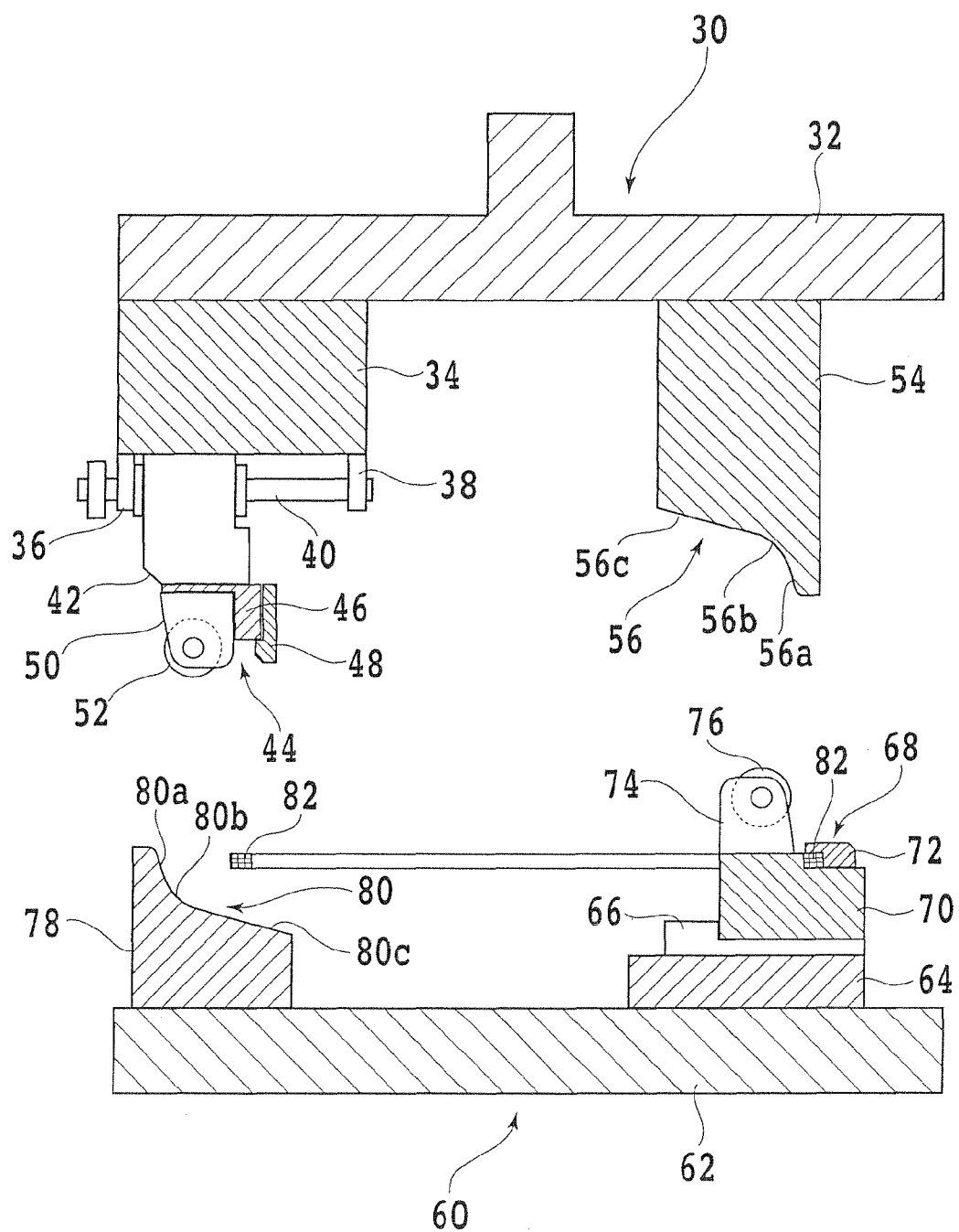
FIG. 6 shows sectional views of the upper die unit and the lower die unit before working, wherein the upper die unit is shown in a sectional view taken along line A-O-A of FIG. 4, and the lower die unit is shown in a sectional view taken along line B-O-B of FIG. 5.
Figure 7:
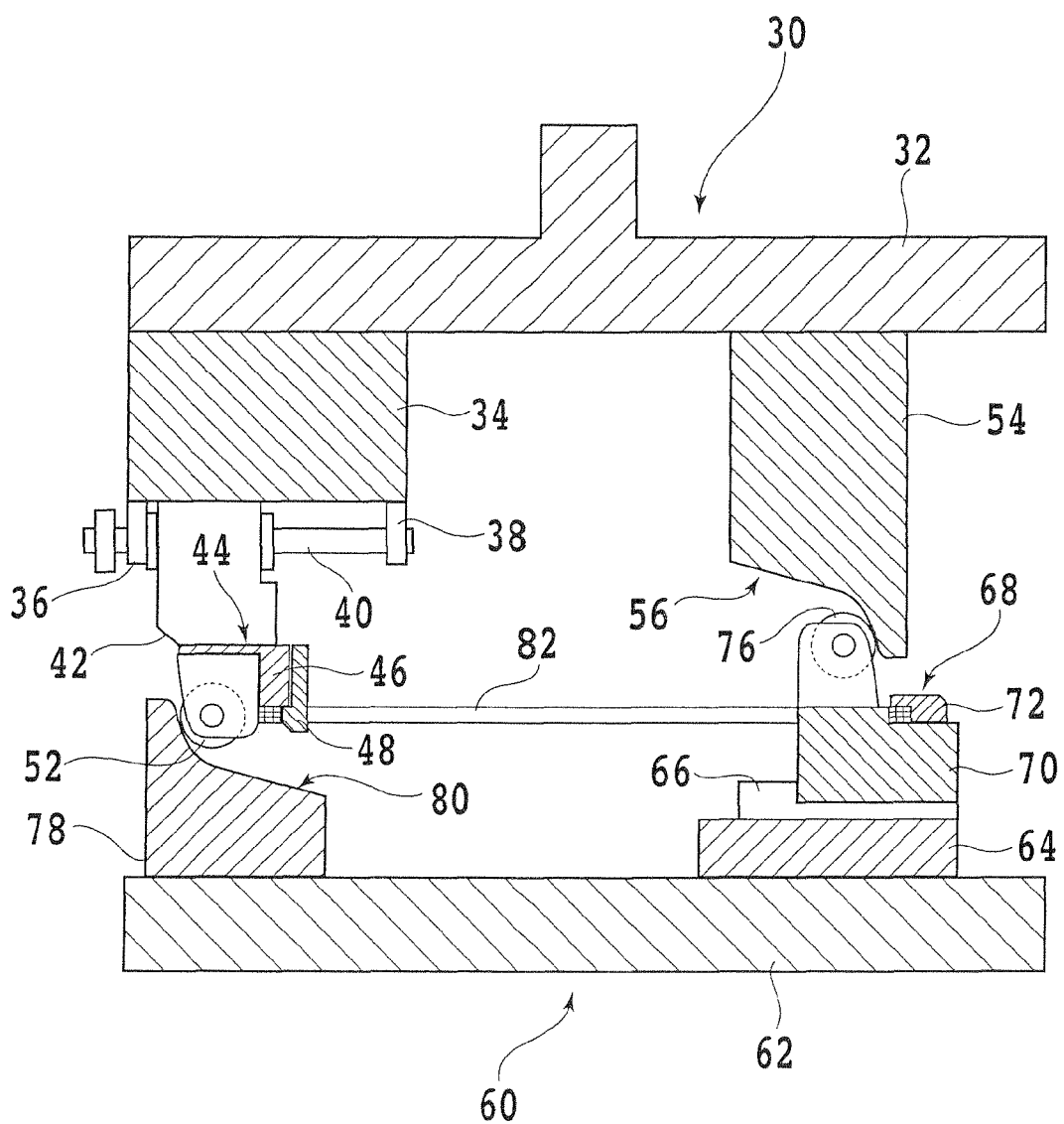
FIG. 7 shows sectional views of the upper die unit and the lower die unit immediately before the start of working.

FIG. 4 is a bottom view of an upper die unit (first die unit) before working, and FIG. 5 is a plan view of a lower die unit (second die unit) before working. The upper die unit and the lower die unit together constitute a die set. FIG. 6 shows sectional views of the upper die unit (first die unit) and the lower die unit (second die unit) before working, wherein the upper die unit is shown in a sectional view taken along line A-O-A of FIG. 4, while the lower die unit is shown in a sectional view taken along line B-O-B of FIG. 5. FIG. 7 shows sectional views of the upper die unit and the lower die unit immediately before the start of working.

First, referring to FIGS. 4 and 6, the structure of the upper die unit (first die unit) 30 will be described. A plurality (in this embodiment, ten) of die support parts 34 are fixed to a base 32 of the upper die unit 30 in the state of being spaced from each other at regular intervals in the circumferential direction. A guide rail 40 is mounted to each die support part 34 through a pair of brackets 36, 38. A slider 42 is mounted so that it can be slid in the radial direction of a loop winding 82 to be formed, along the guide rail 40.

Figure 14:
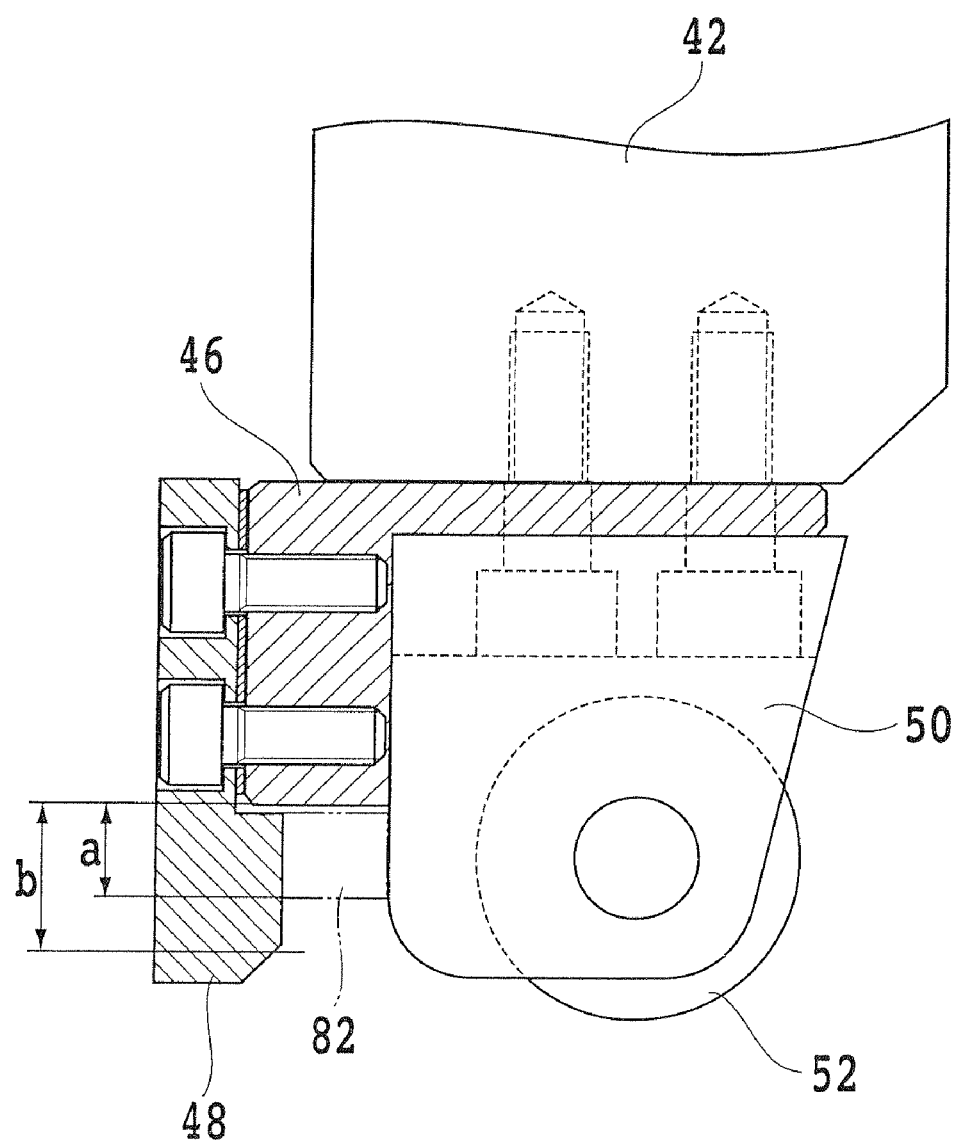
FIG. 14 is an enlarged sectional view showing a pressing part and the loop winding.

A first die (forming part) 44 is attached to each slider 42. Each first die 44 includes a die base 46 and a pressing part 48. As shown in FIG. 14, the pressing part 48 is formed to be longer than the thickness a of the loop winding 82 (namely, b>a) so as to securely hold the loop winding 82. A roller 52 is rotatably mounted on the die base 46 through a pair of brackets 50. In this embodiment, the upper die unit 30 has ten first dies 44 spaced from each other at regular intervals in the circumferential direction, so that the first dies 44 are spaced from each other by 36° along the circumferential direction.

Further, a plurality (in this embodiment, ten) of roller guides 54 are fixed to the upper die unit 30; in this case, the roller guides 54 are spaced from each other at regular intervals in the circumferential direction, and each thereof is disposed at the middle between the adjacent first dies 44, 44. Each roller guide 54 is provided at its tip with a roller rolling surface 56 in the form of a curved surface. The roller rolling surface 56 has a configuration in which (as viewed in section) a steeply inclined substantially rectilinear portion 56a provided on the outer side in the radial direction and a moderately inclined substantially rectilinear portion 56c provided on the inner side in the radial direction are connected to each other by an arcuate portion 56b.

Now, referring to FIGS. 5 and 6, the structure of the lower die unit (second die unit) 60 will be described. A plurality (in this embodiment, ten) of die support parts 64 are fixed to a base 62 of the lower die unit 60 in the state of being spaced from each other at regular intervals in the circumferential direction. Each die support part 64 is provided with a guide rail 66, and a second die (forming part) 68 is mounted so that it can be slid in the radial direction of the loop winding 82, along the guide rail 66.

Each second die 68 includes a die base 70 slidable along the guide rail 66, and a winding pressing member 72. Though not particularly shown, the winding pressing member 72 is bolted to the die base 70 after the loop winding 82 is held by the second die 68. A roller 70 is rotatably mounted on the die base 70 through a pair of brackets 74. The roller 76 of each second die 68 is made to conform to rolling on the roller rolling surface 56 of the roller guide 54 provided in the upper die unit 30; therefore, the second dies 68 are spaced from each other by 36° along the circumferential direction, and each thereof is disposed at the middle in the circumferential direction between the adjacent first dies 44, 44.

Further, a plurality (in this embodiment, ten) of roller guides 78 are fixed to the lower die unit 60; in this case, the roller guides 78 are spaced from each other at regular intervals in the circumferential direction, and each thereof is disposed at the middle between the adjacent second dies 68, 68. Each roller guide 78 is provided at its tip with a roller rolling surface 80 in the form of a curved surface. The roller rolling surface 80 has a configuration in which (as viewed in section) a steeply inclined substantially rectilinear portion 80a provided on the outer side in the radial direction and a moderately inclined substantially rectilinear portion 80c provided on the inner side in the radial direction are connected to each other by an arcuate portion 80b. Each roller guide 78 is provided oppositely to each roller 52 mounted on the upper die unit 30 so that each roller 52 in the upper die unit 30 can roll on the roller rolling surface 80 of each roller guide 78 in the lower die unit 60.

Figure 11:
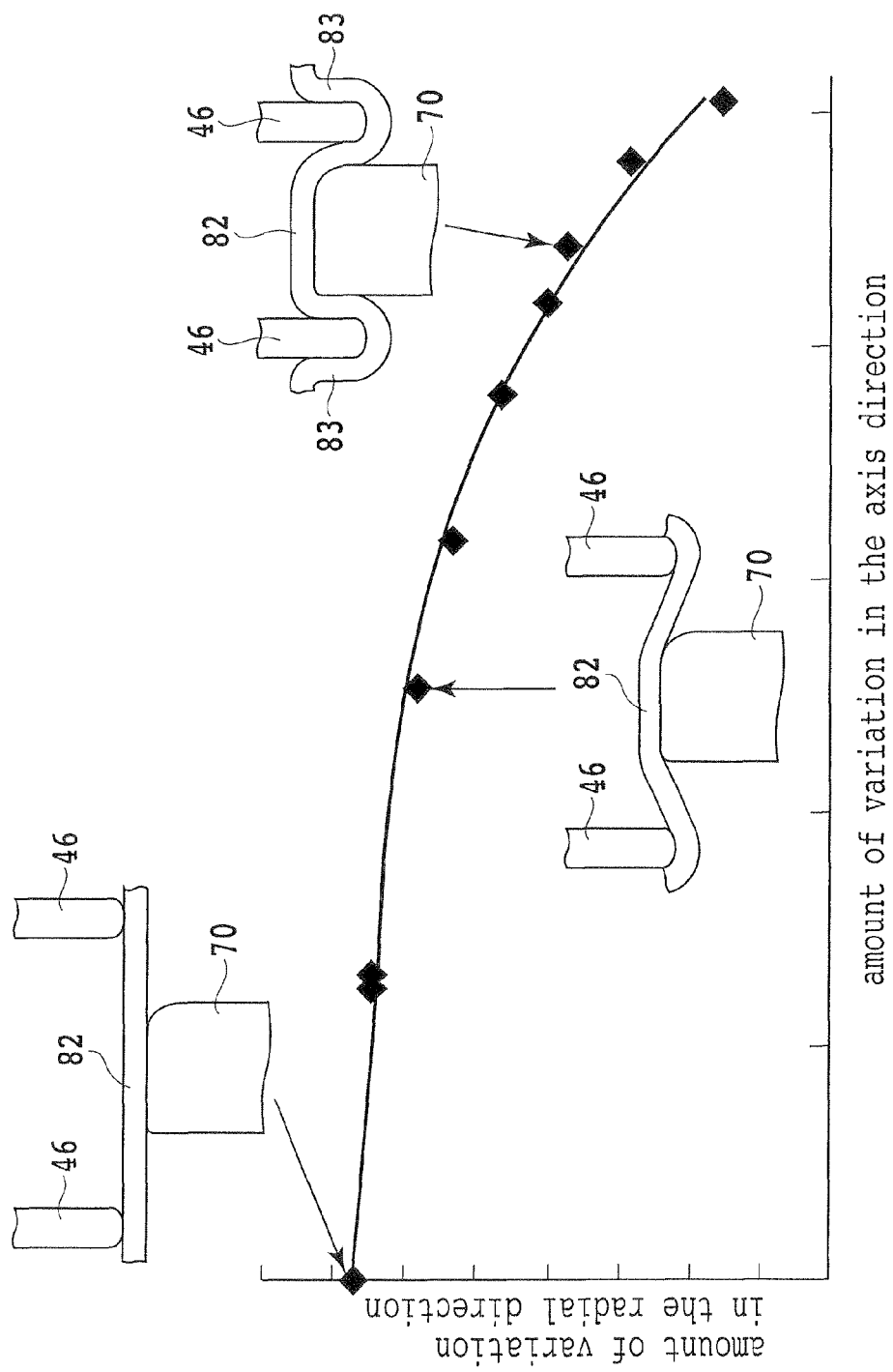
FIG. 11 is a diagram showing the relationship between the amount of variation in the axial direction of the loop winding and the amount of variation in the radial direction of the loop winding.

Now, a method of forming a loop winding by the loop winding forming machine according to the present embodiment as above-described will be described below. First, as shown in FIG. 6, the loop winding 82 is held by the die bases 70 of the second dies 68 of the lower die unit 60, and the pressing members 72 are bolted to the die bases 70. As a result, the loop winding 82 is securely held by the second dies 68 of the lower die unit 60. Starting from this condition, the upper die unit 30 is lowered to the position shown in FIG. 7, and forming (working) of the loop winding 82 is started. At the start of forming (working) as shown in FIG. 7, each roller 52 in the upper die unit 30 makes contact with the steeply inclined substantially rectilinear portion 80a of the roller rolling surface 80 of each roller guide 78 in the lower die unit 60, and each roller 76 in the lower die unit 60 makes contact with the steeply inclined substantially rectilinear portion 56a of the roller rolling surface 56 of each roller guide 54 in the upper die unit 30. In the beginning stage of forming (working), therefore, the loop winding 82 is reduced in the radial direction only slightly, relative to the amount of variation in the axial direction thereof, as shown in FIG. 11.

As the upper die unit 30 is moved further in the axial direction, each roller 52 rolls on the arcuate portion 80b of each roller rolling surface 80, while each roller 76 rolls on the arcuate portion 56b of each roller rolling surface 56. Therefore, the amount of displacement for reducing in the radial direction of the loop winding 82 relative to the amount of displacement in the axial direction of the upper die unit 30 increases gradually. As the press working proceeds further, each roller 52 rolls on the moderately inclined substantially rectilinear portion 80c of each roller rolling surface 80, while each roller 76 rolls on the moderately inclined substantially rectilinear portion 56c of each roller rolling surface 80. Therefore, the amount of displacement in the radial direction relative to the amount of displacement in the axial direction of the loop winding 82 varies along the curve as shown in FIG. 11.

Thus, by adopting the roller rolling surfaces 56, 80 which are each in the shape of a specially shaped curved surface, the ratio of the amount of displacement in the radial direction of the loop winding 82 to the amount of displacement in the axial direction of the loop winding 82 can be varied continuously. Therefore, a plurality of meandering parts 83 can be easily and automatically formed in the loop winding 82 as shown in FIG. 11, without exerting any irrational stress on the loop winding 82.

Figure 8:
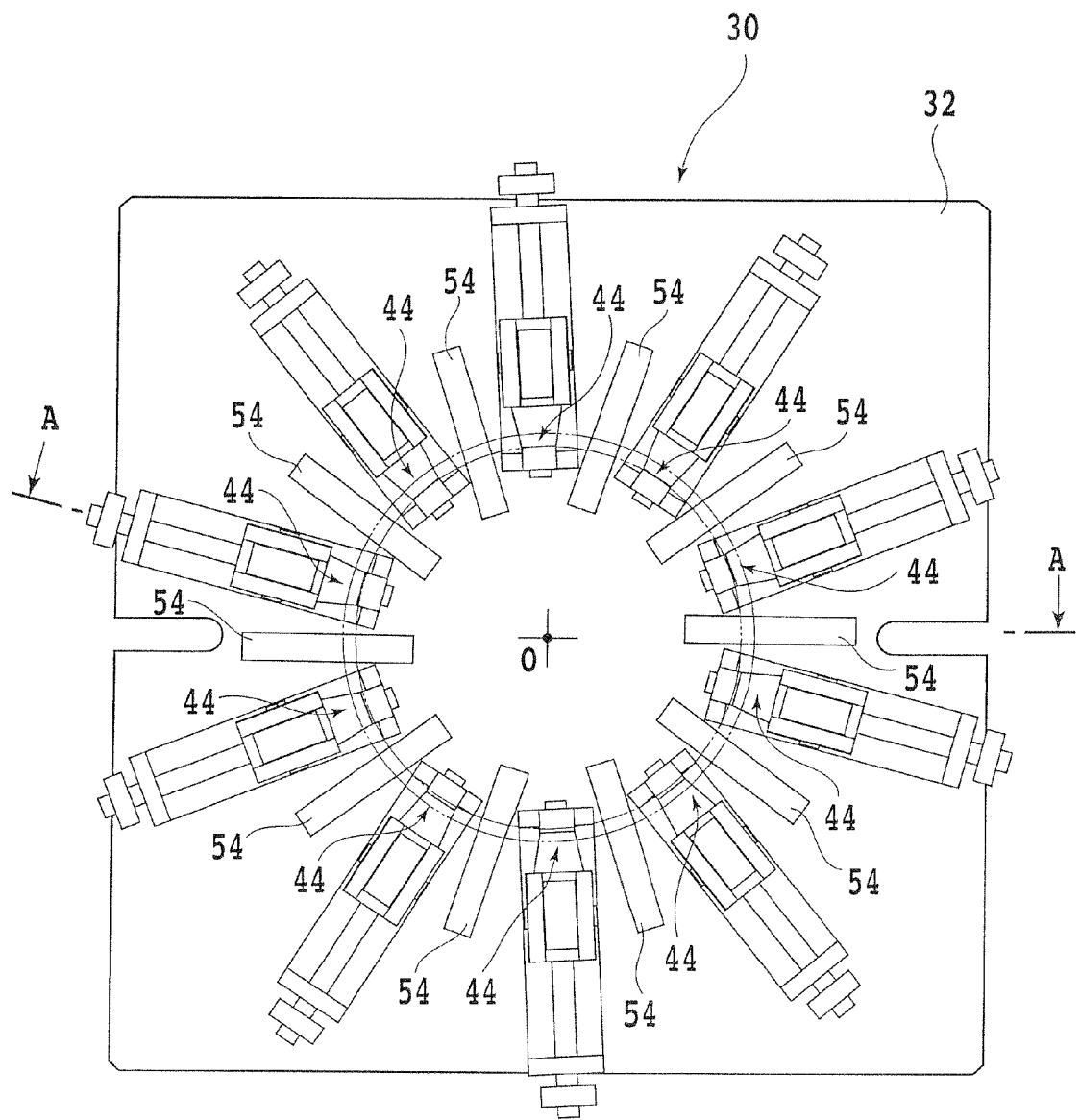
FIG. 8 is a bottom view of the upper die unit after completion of working.
Figure 9:
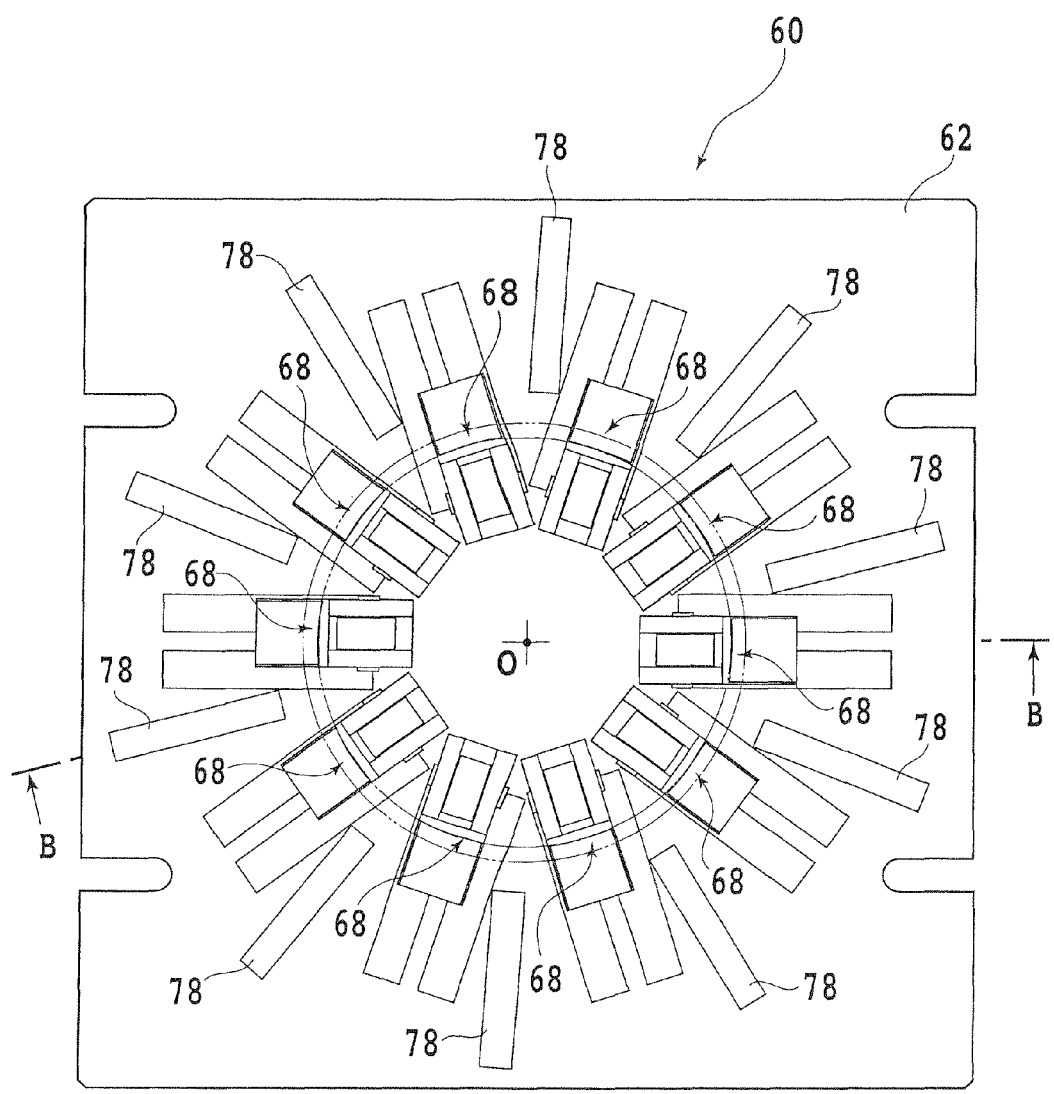
FIG. 9 is a plan view of the lower die unit after completion of working.
Figure 10:
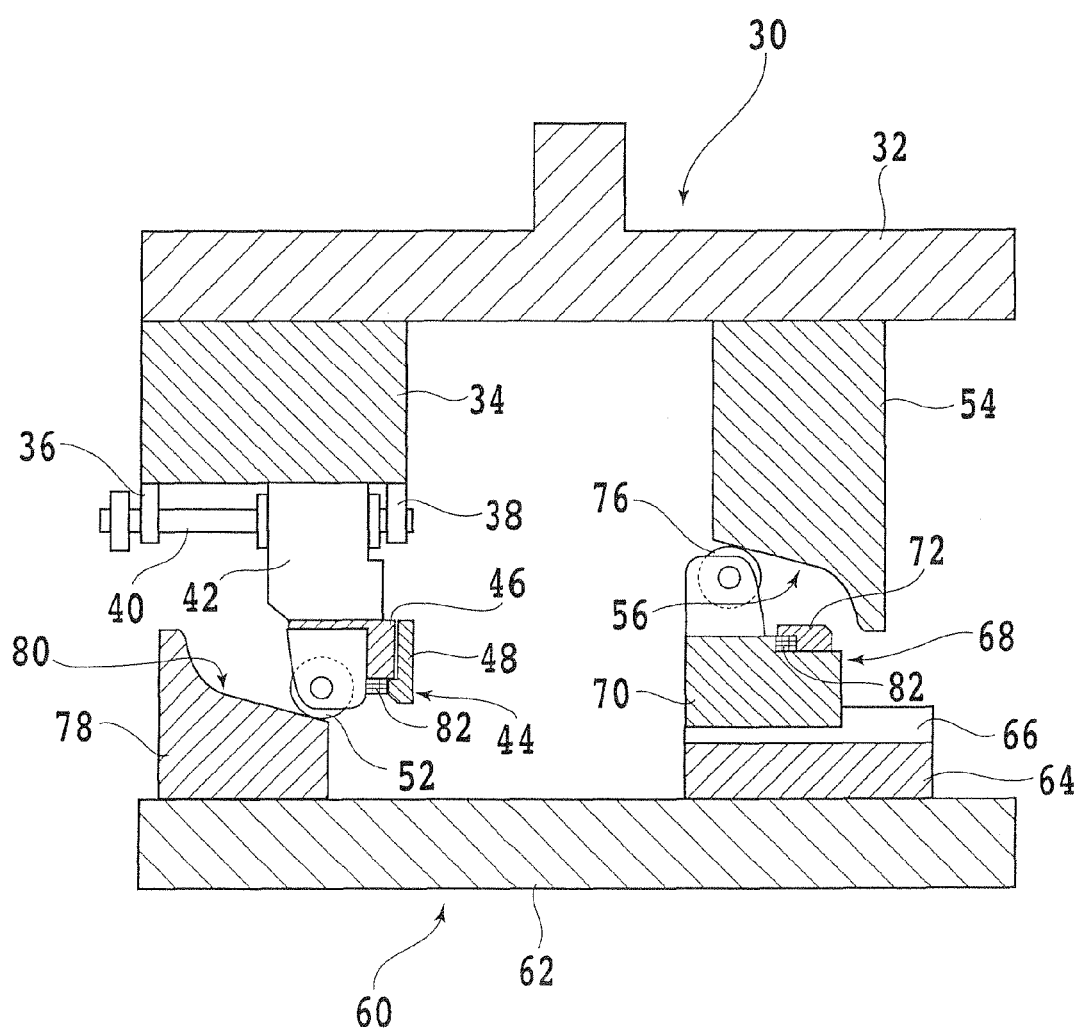
FIG. 10 shows sectional views of the upper die unit and the lower die unit after completion of working, wherein the upper die unit is shown in a sectional view taken along line A-O-A of FIG. 8, and the lower die unit is shown in a sectional view taken along line B-O-B of FIG. 9.

FIG. 8 shows a bottom view of the upper die unit 30 after completion of forming (working), and FIG. 9 shows a plan view of the lower die unit 60 after completion of forming (working). It is seen that the rollers 52, 76 have been moved to the inner side in the radial direction, as compared to their locations before the forming (working) shown in FIGS. 4 and 5. FIG. 10 shows sectional views of the upper die unit 30 and the lower die unit 60 upon completion of the forming (working), wherein the upper die unit 30 is shown in a sectional view taken along line A-O-A of FIG. 8, and the lower die unit 60 is shown in a sectional view taken along line B-O-B of FIG. 9.

Figure 12:
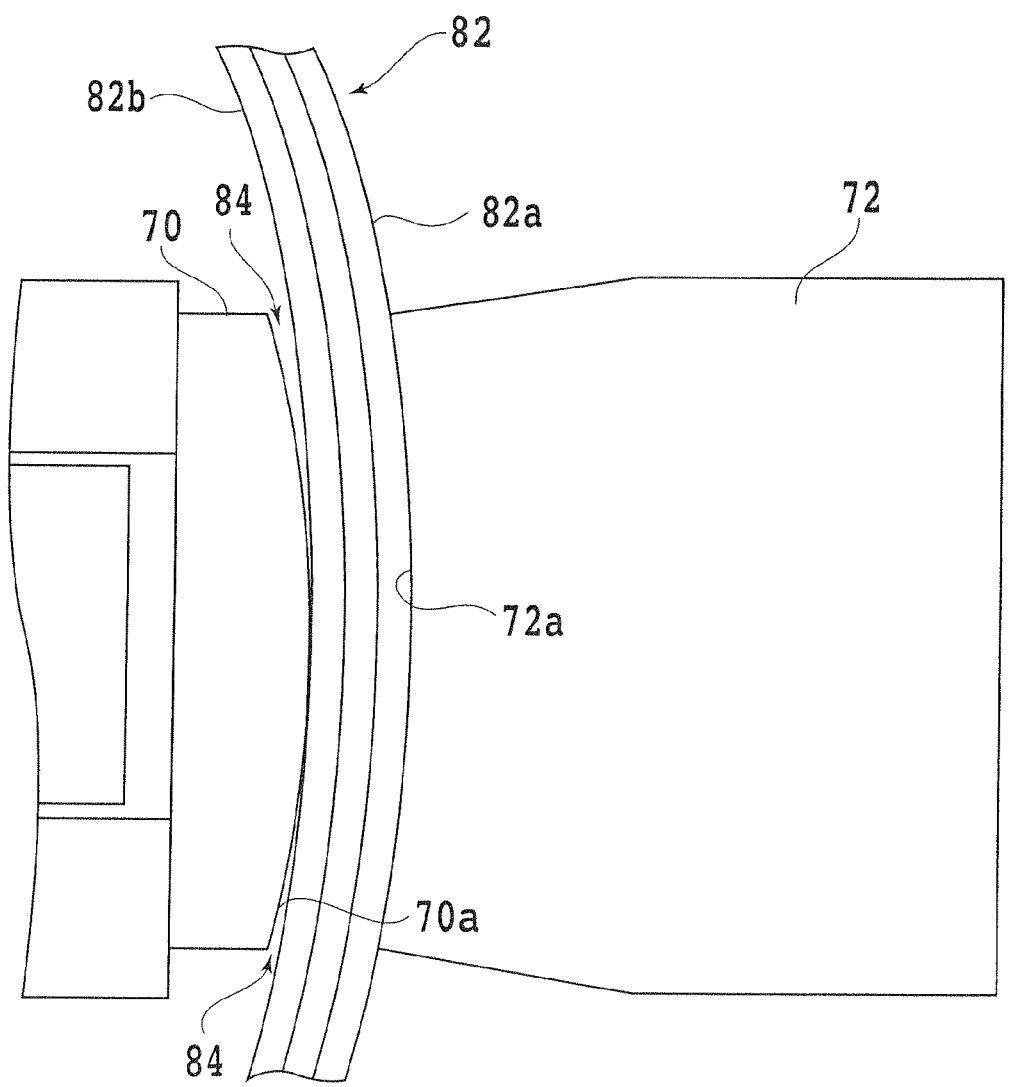
FIG. 12 shows the relationship between the radii of curvature of holding surfaces of a winding holding part and the radius of curvature of the loop winding, before working.
Figure 13:
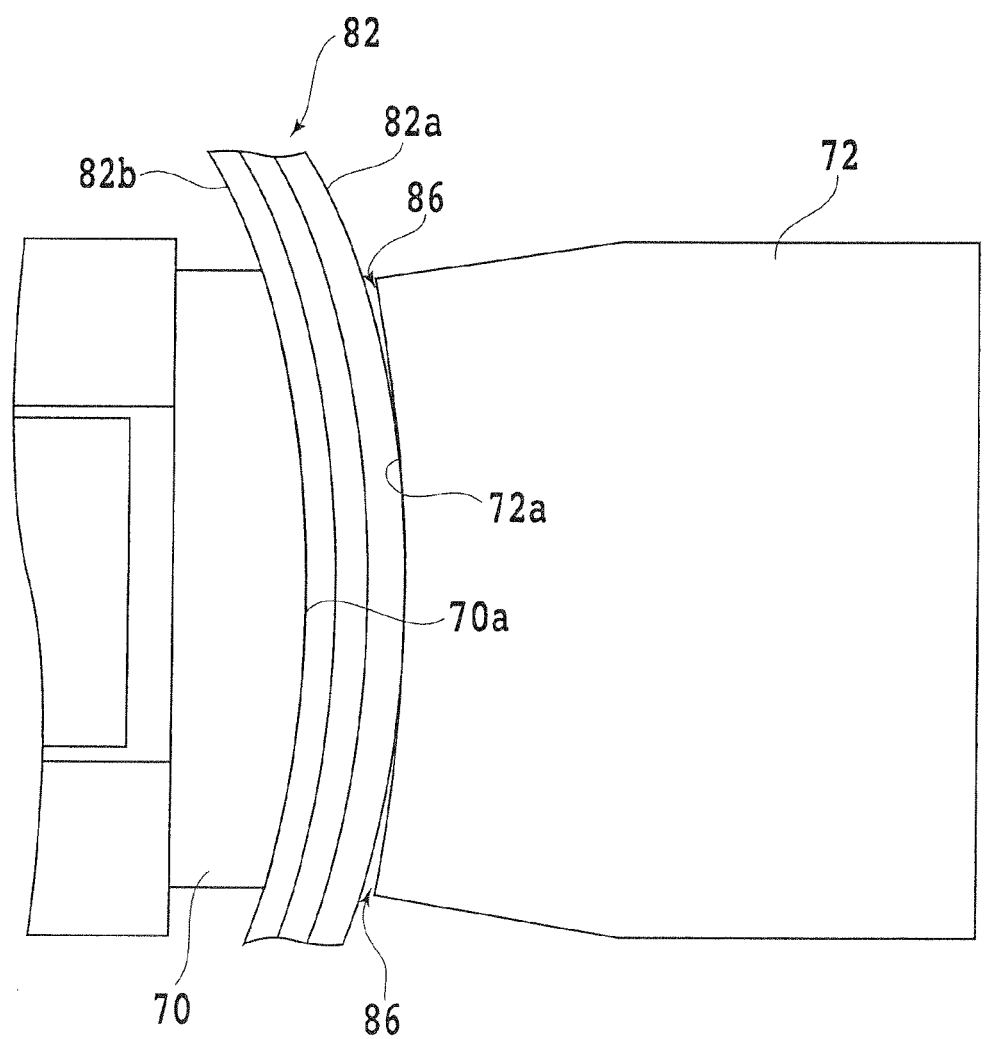
FIG. 13 shows the relationship between the radii of curvature of the holding surfaces of the winding holding part and the radius of curvature of the loop winding, after completion of working.

Now, a preferred shape of the winding holding part in the lower die unit 60 will be described, referring to FIGS. 12 and 13. FIG. 12 shows the winding holding parts 70, 72 before working of the loop winding 82, and FIG. 13 shows the winding holding parts 70, 72 after the working of the loop winding 80. As is clear from FIGS. 12 and 13, a holding surface 72a, facing an outer peripheral part 82a of the loop winding 82, of the winding holding part 72 is preferably configured to have a radius of curvature equal to or greater than the radius of curvature of the outer peripheral part 82a before working of the loop winding 82.

In addition, a holding surface 70a, facing an inner peripheral part 82b of the loop winding 82, of the winding holding part 70 is preferably configured to have a radius of curvature equal to or smaller than the radius of curvature of the inner peripheral part 82b after working of the loop winding 82. Where the radii of curvature of the winding holding parts are set in this manner, gaps 84 are formed between the inner periphery side winding holding surface 70a and the inner peripheral part 82*b* of the loop winding 82 before working as shown in FIG. 12, and gaps 86 are formed between the outer periphery side winding holding surface 72*a* and the outer peripheral part 82*a* of the loop winding 82 after working as shown in FIG. 13. When the radii of curvature of the winding holding surfaces in the lower die unit 60 are set in this manner, the loop winding 82 can be securely held, without exerting any irrational stress on the loop winding 82 before or after the working.

Figure 15:
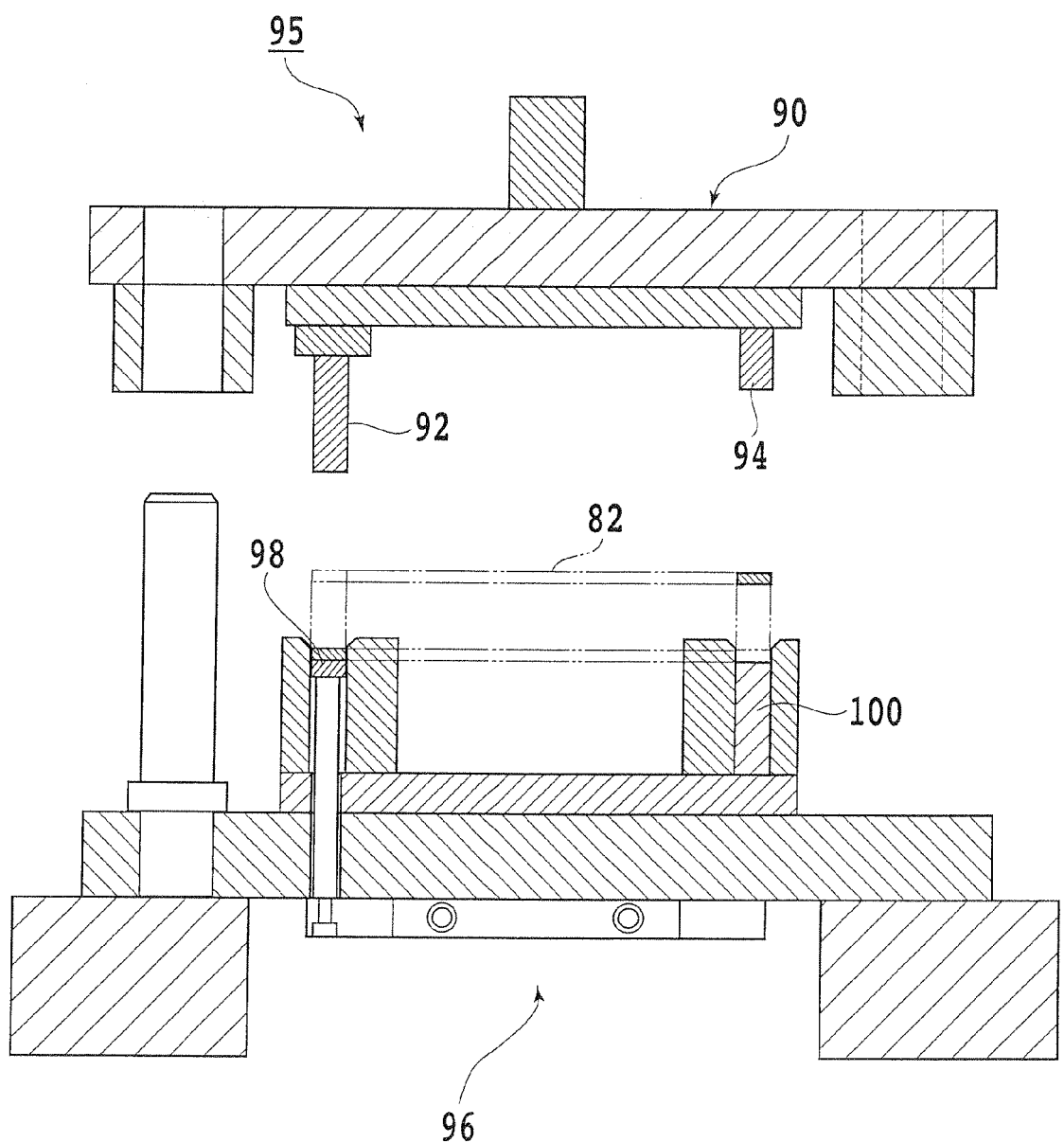
FIG. 15 shows sectional views of a reforming machine before reforming pressing, wherein like FIG. 6, the left half sectional view shows the section before reforming of a meandering part of the meandering loop winding, and the right half sectional view shows the section before reforming of a non-meandering part.
Figure 16:
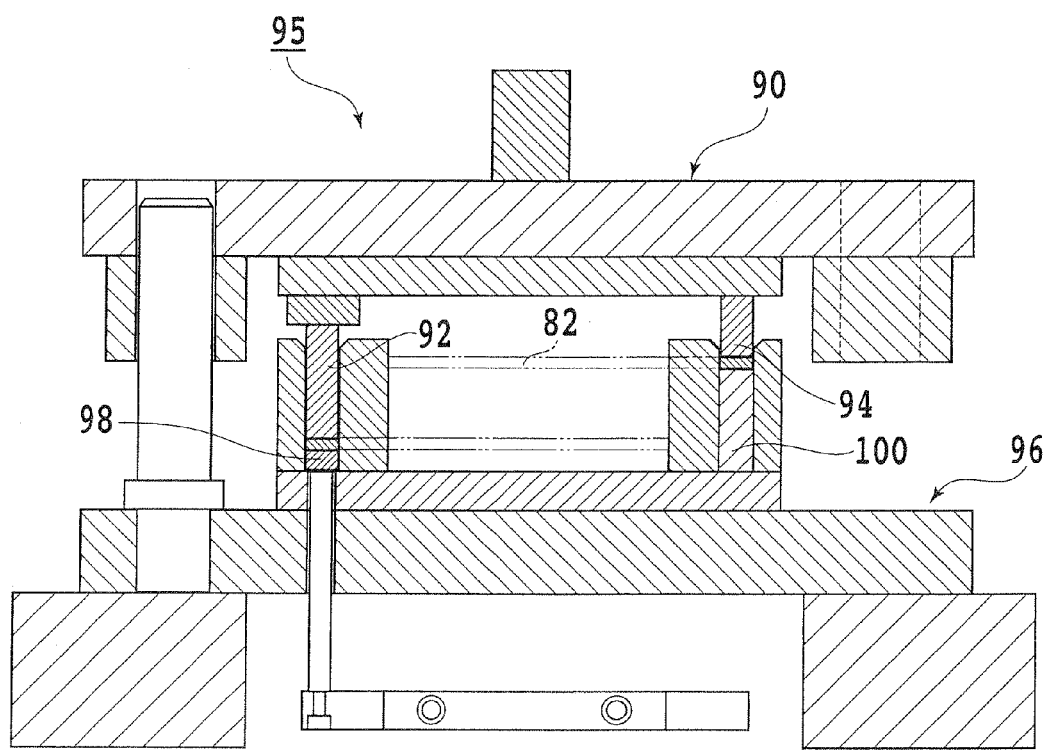
FIG. 16 shows sectional views of the reforming machine after reforming pressing, wherein like FIG. 10, the left half sectional view shows a reformed section of the meandering part of the meandering loop winding, and the right half sectional view shows the reformed section of the non-meandering part.
Figure 17A:
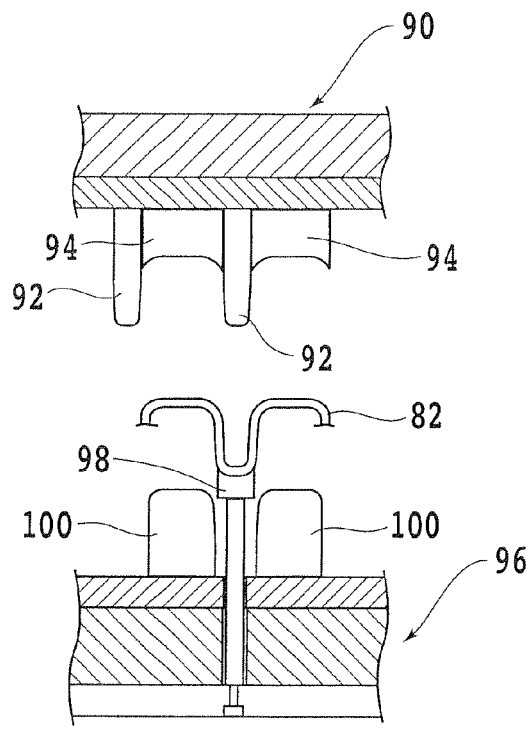
FIG. 17A shows the positional relationship between dies and the loop winding before reforming pressing.

Preferably, after the above-described press working, reforming is conducted for enhancing the shape accuracy of the loop winding 82 provided with the meandering parts 83. The reforming is carried out by use of a reforming machine 95 including an upper die unit 90 and a lower die unit 96 shown in FIG. 15. FIG. 15 shows sectional views of the upper die unit 90 and the lower die unit 96 before reforming, and FIG. 16 shows sectional views of the upper die unit 90 and the lower die unit 96 after reforming. As best shown in FIG. 17A, the upper die unit 90 has a plurality of first dies 92 and a plurality of second dies 94 which are formed alternately along the circumferential direction.

Figure 17B:
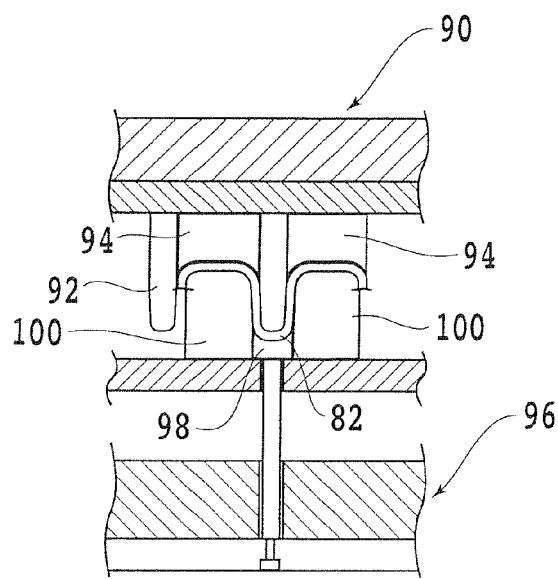
FIG. 17B shows the positional relationship between the dies and the loop winding after the reforming pressing.

As best shown in FIG. 17A, the lower die unit 96 has a plurality of third dies 98 for receiving the first dies 92 and a plurality of fourth dies 100 for receiving the second dies 94, the third and fourth dies 98 and 100 being formed alternately along the circumferential direction. Incidentally, the third die 98 functions also as a knock-out in taking out the loop winding after the reforming. As shown in FIG. 15, the loop winding 82 having the meandering parts 83 is set between an inner diameter frame and an outer diameter frame of the reforming machine 95 including the upper die unit 90 and the lower die unit 96. Then, the upper die unit 90 is lowered to press the loop winding 82. As a result, as shown in FIG. 16 and FIG. 17B, the loop winding 82 is pressed between the first and third dies 92, 98 and between the second and fourth dies 94, 100, whereby the shape accuracy of the loop winding 82 having the meandering parts 83 can be conditioned.

In the preferred embodiment described above, the numbers of the first and second dies 44, 68 used in the initial meandering part pressing work and the numbers of the first, second, third and fourth dies 92, 94, 98, 100 used in the reforming are equal to the number of the poles of the stator of the motor (the number of the teeth). However, the present invention is not limited to this number. The numbers of the first and second dies used in the initial meandering part pressing work or the numbers of the first to fourth dies used in the reforming may be equal to or greater than the number of poles of the stator of the motor.

In addition, the means for controlling the relative positions of the upper die unit 30 and the lower die unit 60 is not limited to the rollers and roller guides described in the above embodiment. For example, the positional relationships between the relevant component parts may be feedback controlled by additionally using air cylinder, hydraulic cylinders, motors or the like.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A method of forming a loop winding having a plurality of meandering parts, said method comprising the steps of:
    disposing a circularly wound loop between a first die unit having a plurality of first dies and a second die unit having a plurality of second dies; and
    press forming the wound loop between said first dies and said second dies by relatively moving said first die unit and said second die unit toward each other,
    wherein said press forming step is so performed as to form from the wound loop said loop winding with the plurality of meandering parts and, simultaneously, to reduce said loop winding in the radial direction.

2. The method as claimed in claim 1, further comprising: reforming said loop winding with the plurality of meandering parts between upper and lower dies enhancing a shape accuracy thereof.

\* \* \* \* \*